(12) United States Patent
Ong et al.

(10) Patent No.: US 12,380,056 B2
(45) Date of Patent: Aug. 5, 2025

(54) NETWORK-ON-CHIP SYSTEM FOR OPTIMIZING DATA TRANSFER

(71) Applicant: SKYECHIP SDN BHD, Penang (MY)

(72) Inventors: Yu Ying Ong, Penang (MY); Chee Hak Teh, Penang (MY)

(73) Assignee: SKYECHIP SDN BHD, Penang (MY)

( * ) Notice: Subject to any disclaimer, the term of this patent is extended or adjusted under 35 U.S.C. 154(b) by 387 days.

(21) Appl. No.: 17/964,548

(22) Filed: Oct. 12, 2022

(65) Prior Publication Data

US 2023/0040323 A1 Feb. 9, 2023

(51) Int. Cl.
*G06F 15/78* (2006.01)

(52) U.S. Cl.
CPC ................................. *G06F 15/7825* (2013.01)

(58) Field of Classification Search
CPC ......................... G06F 15/7825; G06F 15/17306
USPC .......................................................... 370/392
See application file for complete search history.

(56) References Cited

U.S. PATENT DOCUMENTS

| | | | |
|---|---|---|---|
| 10,719,651 B2 | 7/2020 | Garibay, Jr. et al. | |
| 10,922,471 B2 | 2/2021 | Baeckler et al. | |
| 11,165,717 B2* | 11/2021 | Bandic | H04L 45/74 |
| 2011/0243147 A1* | 10/2011 | Paul | H04L 45/60 |
| | | | 370/401 |
| 2014/0229713 A1* | 8/2014 | Muff | G06F 9/3851 |
| | | | 712/208 |
| 2015/0052283 A1* | 2/2015 | Ishii | G06F 13/1621 |
| | | | 710/309 |
| 2015/0341224 A1 | 11/2015 | van Ruymbeke et al. | |
| 2016/0182256 A1* | 6/2016 | Anders | H04L 41/02 |
| | | | 370/352 |
| 2018/0159786 A1* | 6/2018 | Rowlands | H04L 49/109 |
| 2019/0227963 A1* | 7/2019 | Ooi | H01L 25/18 |
| 2021/0168038 A1* | 6/2021 | Gade | H04B 1/583 |
| 2023/0251983 A1* | 8/2023 | Giaconi | G06F 5/06 |
| | | | 710/33 |

FOREIGN PATENT DOCUMENTS

EP          3910522 A1      11/2021

* cited by examiner

*Primary Examiner* — Kwang B Yao
*Assistant Examiner* — Syed M Bokhari (57) ABSTRACT

The present invention relates a network-on-chip (NoC) system for optimizing data transfer, the system comprising a plurality of nodes including a source node and a destination node; characterized by a plurality of routers attached to the plurality of nodes that route a plurality of data packets from the source node to the destination node; wherein each of the plurality of packets is tagged with a routing information (RINFO), each node is assigned with a node unique identifier (ID) and each router is assigned with a router unique identifier (RID) for each horizontal and vertical routing direction for 2D and 3D interconnect topologies; wherein each of the router comprising at least a pair of ingress port and egress port, a route decoder and an arbiter to support a synchronous, an asynchronous and a source-synchronous operations. The present invention also relates to a method of optimizing data transfer using the NoC system.

7 Claims, 9 Drawing Sheets

| $\sum N_z + \sum K_z + X - 1$ | $\sum N_{z-1} + \sum K_z + X - 1$ | | $N_0 + K_0 + x - 1$ | $K_0 + x - 1$ | $x - 1$ | 0 |
|---|---|---|---|---|---|---|
| Turn Z Direction | Turn Z ID | ...... | Turn 0 Direction | Turn 0 ID | VC# | |

NETWORK-ON-CHIP SYSTEM FOR OPTIMIZING DATA TRANSFER

TECHNICAL FIELD

This invention relates generally to a network-on-chip (NOC) system. More particularly, the present invention relates to a novel architecture of a NOC system for optimizing data transfer.

BACKGROUND ART

Due to the interplay between increasing chip capacity and complex applications, System-on-Chip (SoC) development is confronted by severe challenges, such as managing deep submicron effects, scaling communication architectures and bridging the productivity gap. Network-on-Chip (NoC) has been a rapidly developed concept in recent years to tackle the crisis with focus on network-based communication.

US2015341224A1 discloses a system and method of defining the topology of a network-on-chip. The IP sockets and their data transfer connectivity are defined. The location of each IP socket is defined. A number of switches are defined so that there is at least one switch within a distance from each IP socket, the distance being less than that over which a signal propagates within one clock cycle period. The switches are coupled by links. Links may comprise pipeline stages, storage buffers, and are characterized by a data width.

U.S. Pat. No. 10,719,651B2 discloses a SoC interconnect network topology. The corresponding SoC floorplan is divided into windows, which are contiguous and non-overlapping. Within each window a subnetwork of the SoC interconnect network topology is defined that includes links or communication paths between IP blocks in the window as well as links or communication paths that traverse the window. At the shared boundaries of the windows, ports are added and defined as virtual ports. The overall SoC topology can be optimized and synthesized by optimizing each window independently and then incrementally optimizing all links, from end-to-end, that traverse two or more windows. The SoC topology is edited, such as by adding switches, removing switches, and adding and removing switches on routes. An initial location of elements within the floorplan is automatically computed and recommended. Locations can also be edited. Statistical metrics are calculated, including wire length, switch area, SoC area, and maximum signal propagation rate. The SoC overall interconnect network topology is represented by the plurality of windows and the respective subnetworks of each widow. The windows are analyzed and combined and optimized to obtain an overall near-optimal SoC interconnect network topology.

U.S. Pat. No. 10,922,471B2 discloses the techniques for designing and implementing networks-on-chip (NoCs) are provided. For example, a computer-implemented method for programming a network-on-chip (NoC) onto an integrated circuit includes determining a first portion of a plurality of registers to potentially be included in a NoC design, determining routing information regarding datapaths between registers of the first portion of the plurality of registers, and determining an expected performance associated with the first portion of the plurality of registers. The method also includes determining whether the expected performance is within a threshold range, including the first portion of the plurality of registers and the datapaths in the NoC design after determining that the expected performance is within the threshold range, and generating instructions configured to cause circuitry corresponding to the NoC design to be implemented on the integrated circuit.

EP3910522 discloses a system and methods for transformation of a network, such as a network-on-chip (NoC). The system applies a method of clustering to nodes and edges. The clustering transforms the network and produces a deadlock free and optimal network that honors the constraints of the input network's floorplan and specification.

The aforementioned references may strive to provide a network-on-chip (NoC) system to optimize data or network transfer. Nevertheless, they have a number of limitations and shortcomings. For instance, the NoC system in the aforementioned references only support fixed routing without any rotation of the routing information which resulting in a lower operating frequency and no persona optimization. Moreover, conventional synchronous clocking support requires a high power balanced clock tree implementation.

Accordingly, there remains a need to have a NoC system which overcomes the aforesaid problems and shortcomings.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a Network-on-chip (NoC) system having configurable low latency turn-based routing that allows different optimized routing personas.

It is also an objective of the present invention to provide a NoC system that provides source synchronous clocking option allowing for long distance routes without a balanced clock tree.

It is yet another objective of the present invention to provide a NoC system that optimizes data-less transfer over NoC links.

It is further an objective of the present invention to provide a NoC system that supports 2D and 3D interconnect topologies.

Accordingly, these objectives may be achieved by following the teachings of the present invention. The present invention relates a NoC system for optimizing data transfer, the system comprising a plurality of nodes including a source node and a destination node; characterized by a plurality of routers attached to the plurality of nodes that route a plurality of data packets from the source node to the destination node; wherein each of the plurality of data packets is tagged with a routing information (RINFO), each node is assigned with a node unique identifier (ID) and each router is assigned with a router unique identifier (RID) for each horizontal and vertical routing direction, for 2D and 3D interconnect topologies; wherein each of the router comprising at least a pair of ingress port and egress port, a route decoder and an arbiter to support a synchronous, an asynchronous and a source-synchronous operations.

The present invention also relates to a method of optimizing data transfer using the NoC. The method comprising the steps of tagging a plurality of data packets with a RINFO; assigning each node with a node unique ID and each router with a RID; clock crossing a source clock into a clock domain of the router (20) by a clock-crosser; matching a value of the RINFO and the RID by a route decoder to evaluate turn direction of each data packet from a source node to a destination node; and encoding a desired data pattern in the data packets by the source node or the destination node to the node interface.

The foregoing and other objects, features, aspects and advantages of the present invention will become better understood from a careful reading of a detailed description provided herein below with appropriate reference to the accompanying drawings.

BRIEF DESCRIPTION OF THE DRAWING

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiment of this invention and is therefore not to be considered limiting of its scope, for the invention may admit to other equally effective embodiments.

These and other features, benefits, and advantages of the present invention will become apparent by reference to the following text figure, with like reference numbers referring to like structures across the view, wherein.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Figure 1:
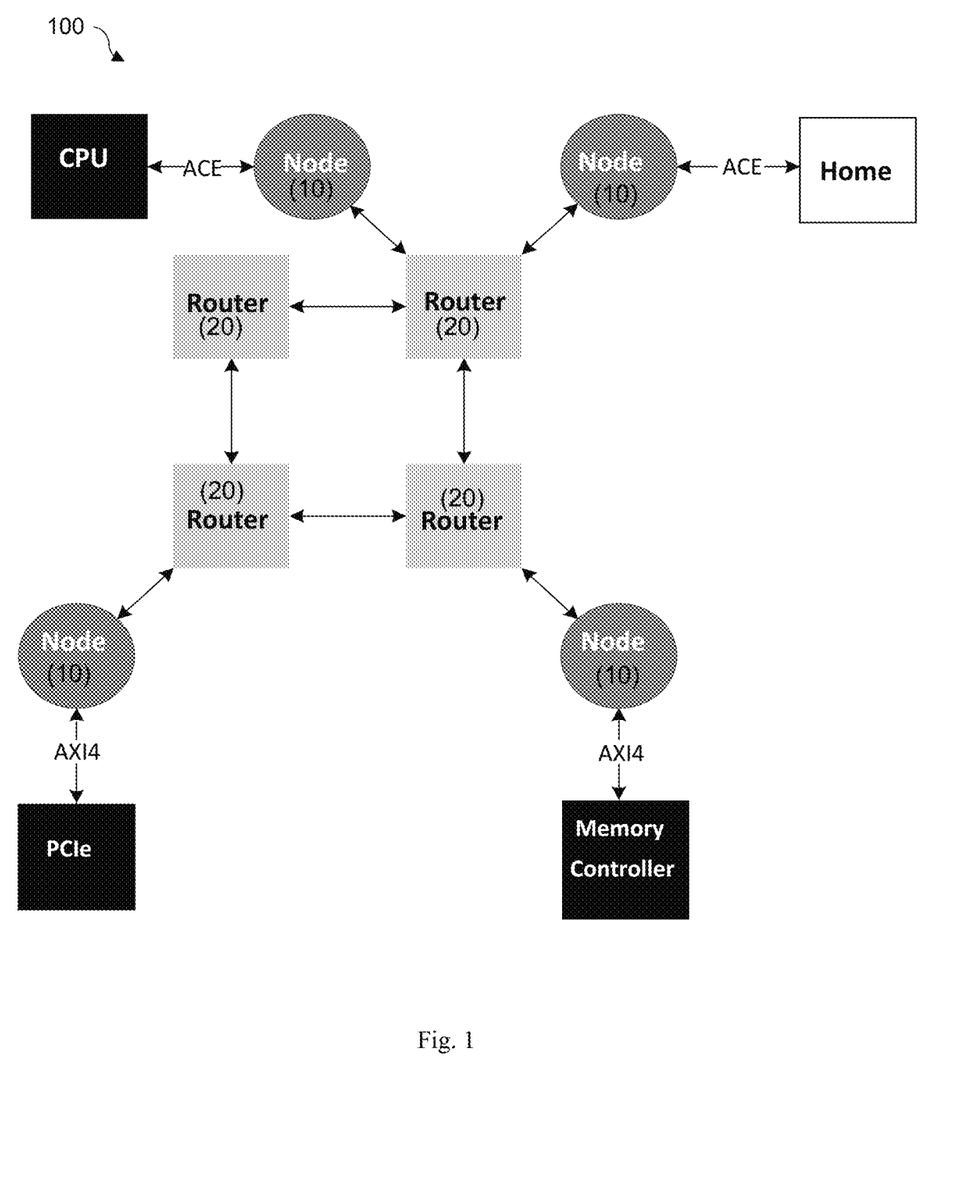
FIG. 1 shows a block diagram of a NoC system for optimizing data transfer according to an embodiment of the present invention.

Referring to FIG. 1, the present invention relates to a network-on-chip (NoC) system (100) for optimizing data transfer, the system comprising a plurality of nodes (10) including a source node and a destination node; characterized by a plurality of routers (20) attached to the plurality of nodes (10) that route a plurality of data packets from the source node to the destination node; wherein each of the plurality of data packets are tagged with a RINFO, each node (10) is assigned with a node unique identifier (ID) and each router (20) is assigned with a router unique identifier (RID) for each horizontal and vertical routing direction, for 2D and 3D interconnect topologies; wherein each of the router (20) comprising at least a pair of ingress port and egress port, a route decoder (21) and an arbiter (22) to support a synchronous, an asynchronous and a source-synchronous operations.

In accordance with an embodiment of the present invention, the plurality of data packets include a complete data packet or multiple fixed-length flow-control units, flits broken from a data packet. The data packets include a read or write request packet and a read or write response packet.

In accordance with an embodiment of the present invention, the routers (20) serve as turning points for the data packets or flits that transverses through the NoC system (100). The routers (20) also serve as attach points of the nodes (10), each of the routers (20) attached preferably up to a maximum of four nodes (10). The routers (20) route the data packets or flits entering from each ingress port to an appropriate egress port and will route the data packets or flits from the source node to the destination node. The link control in the router (20) will examines the data packets or flits and determines the routing direction to route the data packets or flits based on the RINFO in the data packets or flits.

Figure 2:
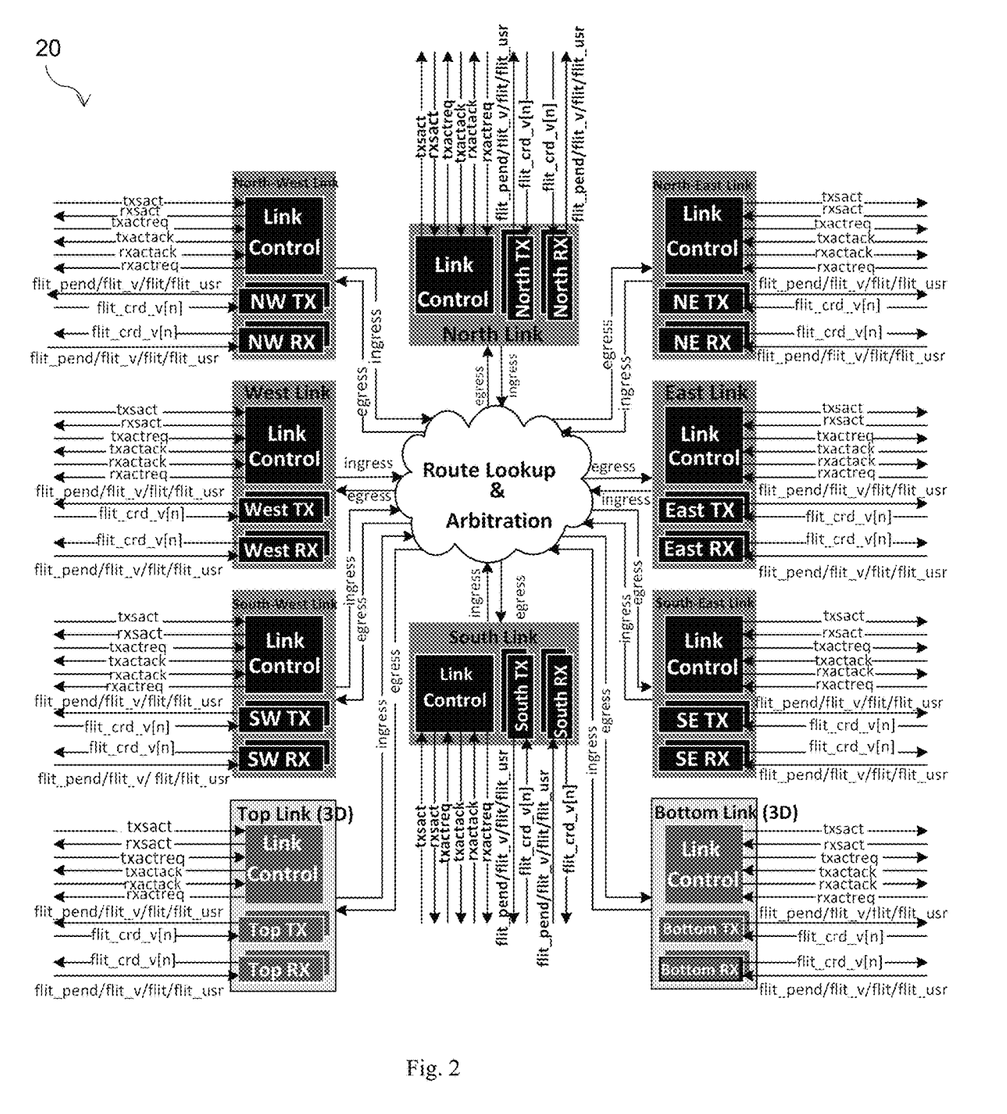
FIG. 2 shows a block diagram of a router according to an embodiment of the present invention.
Figure 3:
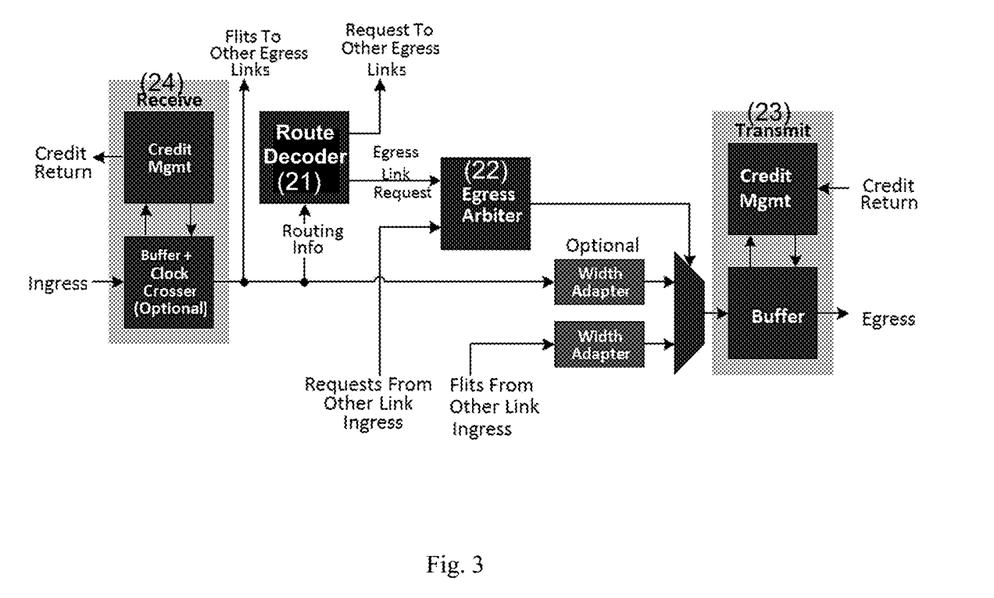
FIG. 3 shows a block diagram of data path in a router link according to an embodiment of the present invention.

Referring to FIG. 2, each router (20) comprises up to eight ingress ports and eight egress ports corresponding to north, north-east, east, south-east, south, south-west, west and north-west direction for 2D interconnect topology or up to ten ingress ports and ten egress ports that further comprises a top and bottom direction for 3D interconnect topology. The routers (20) are user protocol independent, the ingress port and egress port of each router (20) further comprises an ingress link (Rx link) and egress link (Tx link) respectively. The number of links in each router is topology dependent, for instance, each router (10) will have a maximum of eight pairs of ingress and egress link for 2D interconnect topology or a maximum of ten pairs of ingress and egress links for 3D interconnect topology. The top and bottom ingress and egress links are mainly architected for potentially longer delays and will be source-synchronously timed as it is almost impossible to synchronously time different dies in a 3D stack. Each router (20) link can either be connected to another router (20) link or a node (10) link and every link takes the same path as shown in FIG. 3.

Each ingress port or egress port will connect to another egress or ingress port on the adjacent router (20) via a set of physical interconnect wires which also known as channels. More particularly, an ingress port of a current router (20) is connected to an egress port of an earlier router (20) via a link and an egress port of the current router (20) is connected to an ingress port of a successive router (20) via another link. Referring to FIG. 3, the ingress port and egress port comprises transmit (23) and receive buffers (24) to buffer incoming and outgoing network streams respectively. The transmit and receive buffers (23, 24) allow buffering of the data packets or the flits sent over the channels in the router (20). The depth of the transmit and receive buffers (23, 24) are parameterizable but it is preferably to have a depth matches at least a number of pipeline stages inserted in between the router (20) to router (20) link. Additionally, the ingress and egress ports are also responsible to handle the credit management of the channels and virtual channels (VCs). The full number of credit is maintained by the receiver and the credit count is parameterized to match the depth of the receive buffer (RXBUFFER) (24). VCs on the same channel will share the physical wire between routers and each VC comprises a set of ingress or egress ports on a given channel and own set of credit counters and dedicated storage.

Every router (20) supports either a synchronous, an asynchronous or a source-synchronous mode of operation depending on the floorplan selected by the user of the NoC during the design-time generation or implementation. For instance, synchronous mode is used for small system whereas asynchronous or a source-synchronous mode is used for larger system to allow the smaller clock domains receives its clock from the adjacent router source synchronously. For synchronous mode, the routers (20) are clocked with the same clock as that clocking the links at the nodes (10). For asynchronous mode, the routers (20) are clocked with different clock sources and the receiving router's ingress link is responsible to clock-cross the incoming data packets or flits into the router's (20) local clock domain. For source-synchronous operation, the clock is additionally forwarded from either the node (10) or adjacent router (20) on the ingress link. Source-synchronous mode eliminates the need for a balanced clock tree construction as it allows for the clock distribution for the NoC system (100) to be done within the topology itself. Particularly, the clock that clocks the router (20) can be sourced from any of the ingress link's clock. All ingress links except for the link in which the router clock is sourced from will additionally have a clock-crosser implemented to clock cross the ingress into the router clock domain. In order to supply the clock for the routers (20) to function, the ingress link's clock that is selected to clock the router will always need to be toggling regardless the mode operation and state of operation of its active link. System-level co-ordination is also required to clock gate the source synchronous clock propagation.

Figure 4:
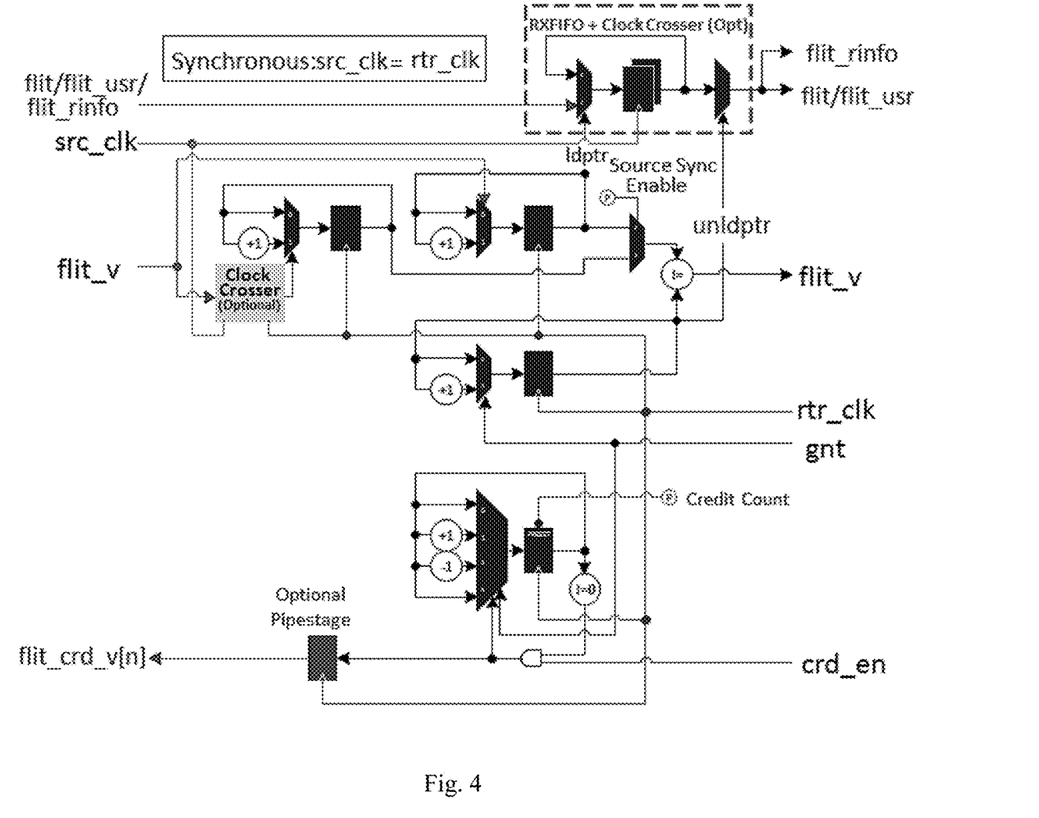
FIG. 4 shows a block diagram of a router ingress port according to an embodiment of the present invention.
Figure 5:
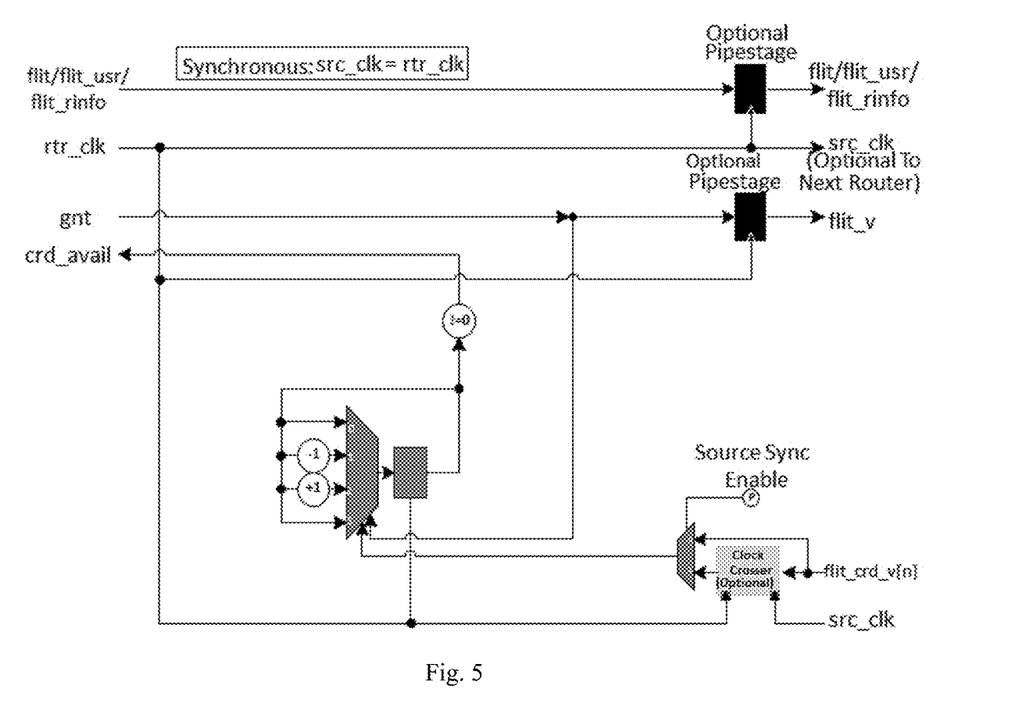
FIG. 5 shows a block diagram of a router egress port according to an embodiment of the present invention.

Referring to FIG. 4 and FIG. 5, the ingress and egress ports also optionally implement asynchronous clock-crossers to clock cross the source clocks into the local router clock domain. This allows for source synchronous clocking support in between the routers. It also comprises parameterizable flop stages to allow for better timing at the expense of latency. The flops are added to ease timing closure or removed to reduce the latency of the flits flowing through the router.

The route decoder (21) within the routers (20) decodes the route direction for the data packets or flits based on the RINFO associated with the data packets or flits. Route decoder (21) prepares the RINFO for the next turn by manipulating and rotating the RINFO. In addition, the route decoder (21) presents the data packets or flits to the appropriate egress arbiter (22) for arbitration. The egress arbiter (22) arbitrates among the different data packets or flits targeting the same egress port based on the arbitration policy and arbitrates the ingress link of the router to its egress link.

In accordance with an embodiment of the present invention, the nodes (10) including source node and destination node in the NoC system (100) that support data-less transfers. The nodes (10) will sniff the transfer of write request or read response data packets from the node interface to detect the desired data pattern of the data packets including but not limited to all zeroes, all ones or a set of programmable fixed data patterns. The source nodes and the destination nodes are also pre-configured with the programmable fixed data patterns on both end in order to support data-less transfers. When the write request packet is transferred from the source node to the destination node, the source node encodes the desired data pattern within the write request packet to inform the destination node on how to synthesis the data for the write data packet. Accordingly, the data of the write request will be synthesized by the destination node to the node interface based on the encoded data pattern in the write request packet sent by the source node. When the read response packet is transferred from the destination node to the source node, the destination node will encoded the same encoded pattern within the read response packet. The data for the read response packet will be synthesized by the source node to the node interface based on the encoded data pattern in the read response packet sent by the destination node. Hence, the data-less write request packets and the data-less read response packets will never have an associated data being transferred but will have the data encoded within the request or response.

The present invention also relates to a method of optimizing data transfer using the network-on-chip system (100). The method comprising the steps of tagging a plurality of data packets with a RINFO; assigning each node (10) with a node unique ID and each router (20) with a RID; clock crossing a source clock into a clock domain of the router (20) by a clock-crosser preferably but not limited to an asynchronous clock crosser; matching a value of the RINFO and the RID by a route decoder (21) to evaluate turn direction of each data packet from a source node to a destination node; and encoding a desired data pattern in the data packets by the source node or the destination node to the node interface.

Hereinafter, examples of the present invention will be provided for more detailed explanation. It will be understood that the examples described below are not intended to limit the scope of the present invention.

EXAMPLE

Figure 6:
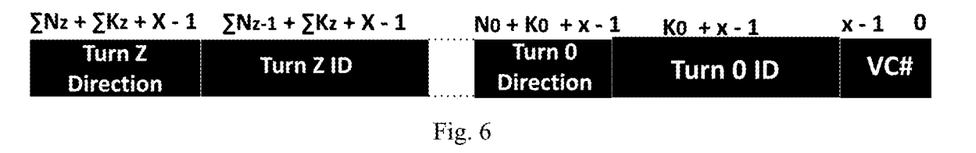
FIG. 6 shows a format of RINFO in a data packet according to an embodiment of the present invention.

The example of the format of the RINFO is illustrated in FIG. 6. If virtual channel (VC) support is enabled in the router (20), the VC# field in the RINFO is used to steer the incoming and outgoing data packets or flits into the right VC storage and arbitration except for route decode. RINFO that's included as part of flit is configurable on the node (10). For example, when the NoC is operating in mode A, the RINFO will be configured to config A. When user of the NoC wish to reconfigure the NoC to operate in a different mode for instance mode B, the RINFO can be changed on the node (10) to allow the data packets or flit to take a different route compared to mode A. This allow flexibility for user to reconfigure the NoC to support different mode as mode A might be preferred in some use case but mode B might be preferred in a different use case.

TABLE 1

Turn direction encoding for routers

| Encoding | Ingress | 2D Direction | Augmented 3D Direction |
|---|---|---|---|
| 000b | Horizontal | North Link | North Link |
|  | Vertical | Invalid | Top Link |
| 001b | Horizontal | South Link | South Link |
|  | Vertical | Invalid | Bottom Link |
| 010b | Horizontal | Invalid | Top Link |
|  | Vertical | East Link | East Link |
| 011b | Horizontal | Invalid | Bottom Link |
|  | Vertical | West Link | West Link |
| 100b | Horizontal | North-West Link | North-West Link |
|  | Vertical |  |  |
| 101b | Horizontal | South-East Link | South-East Link |
|  | Vertical |  |  |
| 110b | Horizontal | North-East Link | North-East Link |
|  | Vertical |  |  |
| 111b | Horizontal | South-West Link | South-West Link |
|  | Vertical |  |  |

Table 1 shows the encoding for the Turn 0 Direction (TDR0), a TDR0 value of 100b or greater will always be an exit to a node (10) while a value of less than 100b for TDR0 could be an exit to a node (10) or to another router (20).

The route decoder (21) will always matching the Turn 0 ID of the flit or data packets ingress from the horizontal link (East link and West link) with the vertical RID (vRID) and matching the turn direction of the flit or data packets ingress from the vertical link (North link and south link) with the horizontal RID (hRID). If the Turn 0 ID (TID 0) matches its RID segment, it will then evaluate the Turn 0 Direction (TDR0) to know which direction to route the flit to. The route decoder (21) will also rotate the Turn 1 ID (TID1) and Turn 1 Direction (TDR1) as TID0 and TDR0 before the RINFO is sent to the destination egress port. Therefore, the data packets or flit has made a turn and the rotation of the TID1 and TDR1 into the TID0 and TDR0 which prepares the packet for the next future turn that the packet needs to make. For example, assuming the RINFO in a data packet or flit is TDR1, TID1, TDR0 and TID0, after the TID0 has matched with the RID segment and a turn is performing using TDR0, the RINFO will be rotated to TDR0, TID0, TDR1 and TID1 so that the adjacent router (20) can use the TID1 and TDR1 for route decoding. The hRID and vRID segments may not necessarily have equal number of bits so the shift of the bits within the router (20) will account for that which allows for a short ID compare for route decode.

Figure 7:
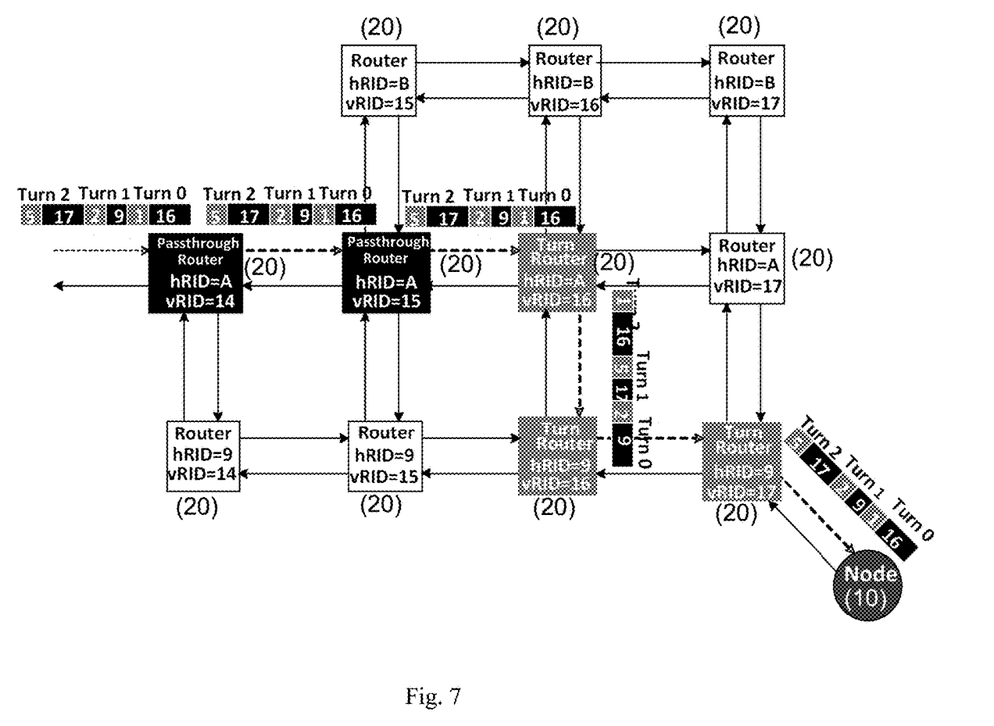
FIG. 7 shows an example of route decoding across the routers in a 2D NoC system according to an embodiment of the present invention.

Additional manipulation can be done to the TID0 and TDR0 before it is rotated to the end of the RINFO to facilitate the reverse mapping of the route and allow the destination node to return the read or write response data packet from the destination node to the source node using the same route as that used by the source node to destination node. This is accomplished by replacing the TID0 and TDR0 with the reverse turn direction ID and direction for the return route. For example, if a forward route (source node to destination node) enters a router (20) from the West link and matches the vRID of the router (20) to turn to the South link, it will replace the TID0 with the hRID of the router (20) and replace the TDR0 with the West link. If the TID0 of the flit does not match the RID segment, it will be routed in the passthrough path. For example, a flit or data packet that enters through the North ingress port with a TID0 that does not match the RID of the router will be routed to the South egress port. In this case, the RINFO will be passed from the ingress port to the egress port and it is not rotated due to unmatched RID. An example of how the route decoding works across the routers (20) is shown in FIG. 7.

Figure 8:
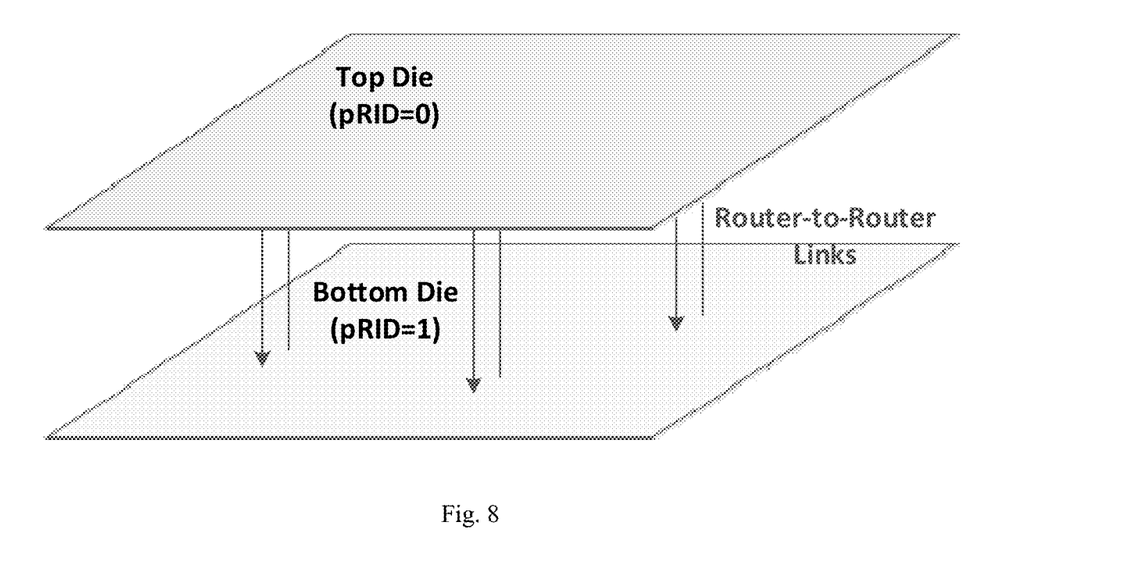
FIG. 8 shows an example of router to router link between a top die and a bottom die according to an embodiment of the present invention.
Figure 9:
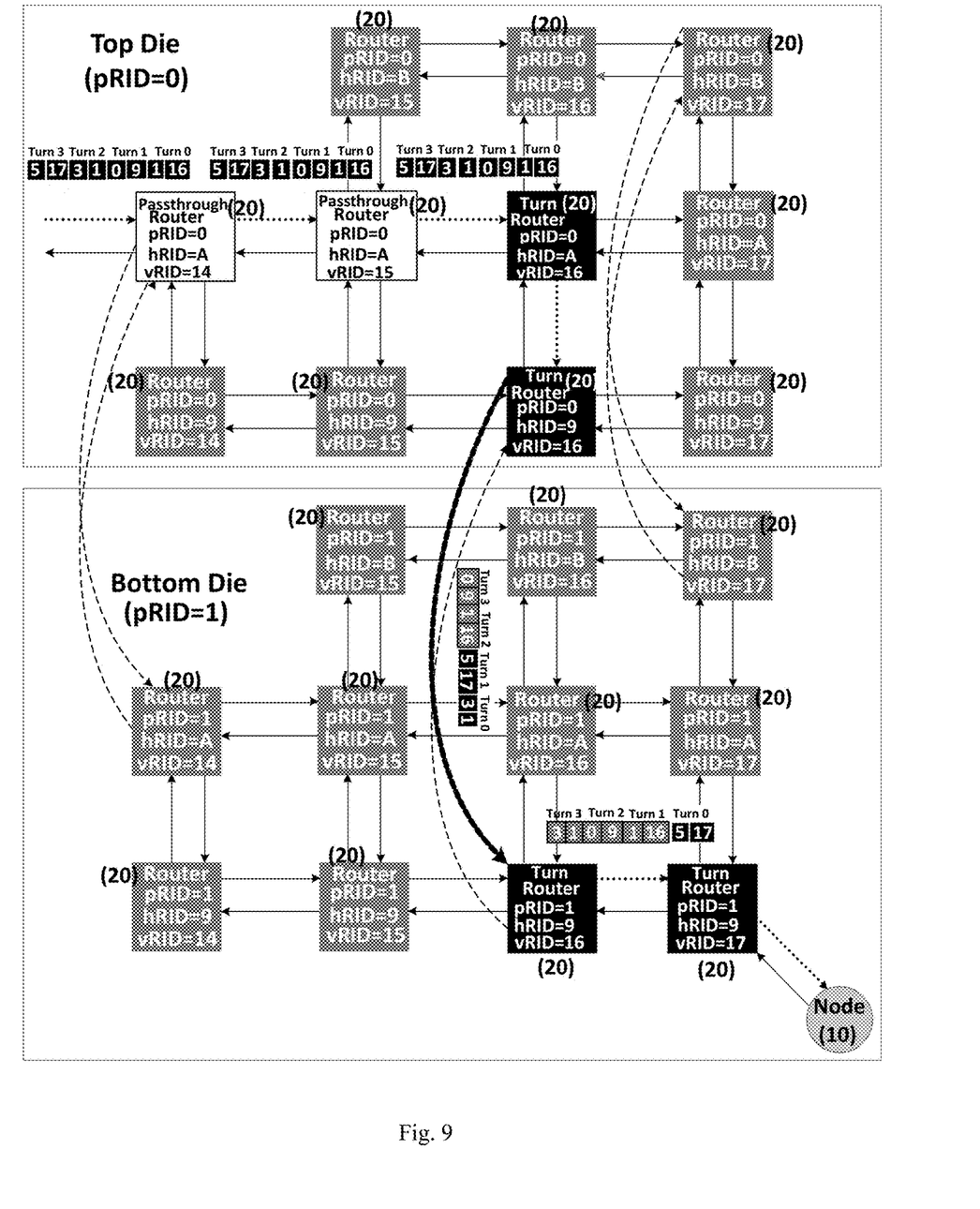
FIG. 9 shows an example of route decoding across the routers in a 3D NoC system according to an embodiment of the present invention.

For 3D connectivity support, the RID is extended with perpendicular segment (pRID) but eliminate the need of extra bits by reusing the turn direction encoding based on the ingress port orientation. A match is observed between the TID0 and the RID that is not in the segment the flit or data packet is travelling in. For example, if the flit or data packet is entering the router (20) horizontally, the TID0 will be matched against the vRID and pRID. If the flit or data packet is entering the router (20) vertically, the TID0 is matched against the hRID and pRID. If the flit or data packet is entering the router (20) perpendicularly, the TID0 will be matched against the vRID and hRID. A match on the segments RID will cause the router (20) to route the flit or data packet in that segment's direction. Furthermore, if the TDR0 indicates a direction that is the same as the ingress port direction (e.g., TDR0 of 010b or 011b for an East or West ingress port), the turn direction is augmented to indicate a route into different 3D NoC mesh. The augmented 3D direction based on the ingress port is shown in Table 1, the 3D direction is expected to always connect between router (20) to router (20) as router (20) to node (10) or node (10) to router (20) direction is not supported. Upon reaching the router (20) of the other die's NoC mesh, the router (20) on the other die will compare ingress flit's TID0 with its pRID for a match. If there is a match, the TDR0 will indicate the direction within the NoC mesh of the current die. All encodings are valid for ingress ports of the Top and Bottom Links, if no match is found, it will continue to traverse in the perpendicular direction to another die such as from ingress port of Top link to the egress port of Bottom link or vice versa until a match is found. An example of how the route decoding works across the routers (20) in a 3D NoC configuration is shown in FIG. 8 and FIG. 9.

The NoC system (100) and the method of optimizing data transfer using the NoC system (100) of the present invention provides support for configurable low latency turn-based routing with variable ID widths for 2D or 3D interconnect allowing for different optimized routing personas. The NoC system (100) also supports source synchronous clocking option which allows long distance routes without a balanced clock tree.

The exemplary implementation described above is illustrated with specific characteristics, but the scope of the invention includes various other characteristics.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

It is to be understood that any prior art publication referred to herein does not constitute an admission that the publication forms part of the common general knowledge in the art.

What is claimed is:

1. A method of optimizing data transfer using a network-on-chip system, wherein the network-on-chip system comprises:
   a plurality of nodes including a source node and a destination node;
   wherein a plurality of routers are attached to the plurality of nodes that route a plurality of data packets from the source node to the destination node;
   wherein each of the plurality of data packets is tagged with a routing information, each node is assigned with a node unique identifier, and each router is assigned with a router unique identifier for each horizontal and vertical routing direction, for 2D and 3D interconnect topologies; and
   wherein each router comprises at least a pair of ingress port and egress port, a route decoder and an arbiter to support a synchronous, an asynchronous and a source-synchronous operations;
   the method comprises:
   tagging the plurality of data packets with the routing information;
   assigning each node with the node unique identifier and each router with the router unique identifier;
   clock crossing a source clock into a clock domain of the router by a clock-crosser;
   matching a value of the routing information and the router unique identifier by the route decoder to evaluate turn direction of each data packet from the source node to the destination node;
   encoding a desired data pattern in the data packets by the source node or the destination node to a node interface; and
   matching the value of the routing information and the router unique identifier for each data packet which ingresses from a horizontal link with a vertical router unique identifier using the route decoder.

2. The method as claimed in claim 1, wherein the method further comprises:
   matching a value of the routing information and the router unique identifier by a route decoder to evaluate turn direction of each data packet from a router to an adjacent router.

3. The method as claimed in claim 2, wherein the method further comprises:
   matching the value of the routing information and the router unique identifier for each data packet which ingresses from the horizontal link with the vertical router unique identifier and a perpendicular unique identifier using the route decoder.

4. The method as claimed in claim 2, wherein the method further comprises:
   matching the value of the routing information and the router unique identifier for each data packet which ingresses from a vertical link with a horizontal router unique identifier and a perpendicular unique identifier using the route decoder.

5. The method as claimed in claim 2, wherein the method further comprises:
   matching the value of the routing information and the router unique identifier for each data packet which ingresses from a perpendicular link with a horizontal router unique identifier and the vertical router unique identifier using the route decoder.

6. A method of optimizing data transfer using a network-on-chip system, wherein the network-on-chip system comprises:
   a plurality of nodes including a source node and a destination node;
   wherein a plurality of routers are attached to the plurality of nodes that route a plurality of data packets from the source node to the destination node;
   wherein each of the plurality of data packets is tagged with a routing information, each node is assigned with a node unique identifier and each router is assigned with a router unique identifier for each horizontal and vertical routing direction, for 2D and 3D interconnect topologies; and
   wherein each router comprises at least a pair of ingress port and egress port, a route decoder and an arbiter to support a synchronous, an asynchronous and a source-synchronous operations;
   the method comprises:
   tagging the plurality of data packets with the routing information;
   assigning each node with the node unique identifier and each router with the router unique identifier;
   clock crossing a source clock into a clock domain of the router by a clock-crosser;
   matching a value of the routing information and the router unique identifier by the route decoder to evaluate turn direction of each data packet from the source node to the destination node;
   encoding a desired data pattern in the data packets by the source node or the destination node to a node interface; and
   matching the value of the routing information and the router unique identifier for each data packet which ingresses from a vertical link with a horizontal router unique identifier using the route decoder.

7. A method of optimizing data transfer using a network-on-chip system, wherein the network-on-chip system comprises:
   a plurality of nodes including a source node and a destination node;
   wherein a plurality of routers are attached to the plurality of nodes that route a plurality of data packets from the source node to the destination node;
   wherein each of the plurality of data packets is tagged with a routing information, each node is assigned with a node unique identifier and each router is assigned with a router unique identifier for each horizontal and vertical routing direction, for 2D and 3D interconnect topologies; and
   wherein each router comprises at least a pair of ingress port and egress port, a route decoder and an arbiter to support a synchronous, an asynchronous and a source-synchronous operations;
   the method comprises:
   tagging the plurality of data packets with the routing information;
   assigning each node with the node unique identifier and each router with the router unique identifier;
   clock crossing a source clock into a clock domain of the router by a clock-crosser;

matching a value of the routing information and the router unique identifier by the route decoder to evaluate turn direction of each data packet from the source node to the destination node;

encoding a desired data pattern in the data packets by the source node or the destination node to a node interface; and manipulating an encoding of the turn direction in the routing information at the router and rotating the encoding of the turn direction in the routing information by the route decoder.

* * * * *